May 18, 1926. 1,585,300
H. N. McLEOD
PROCESS FOR THE SEPARATION OF THE SOLID CONSTITUENTS
OF LIQUIDS CONTAINING THEM
Filed June 28, 1924
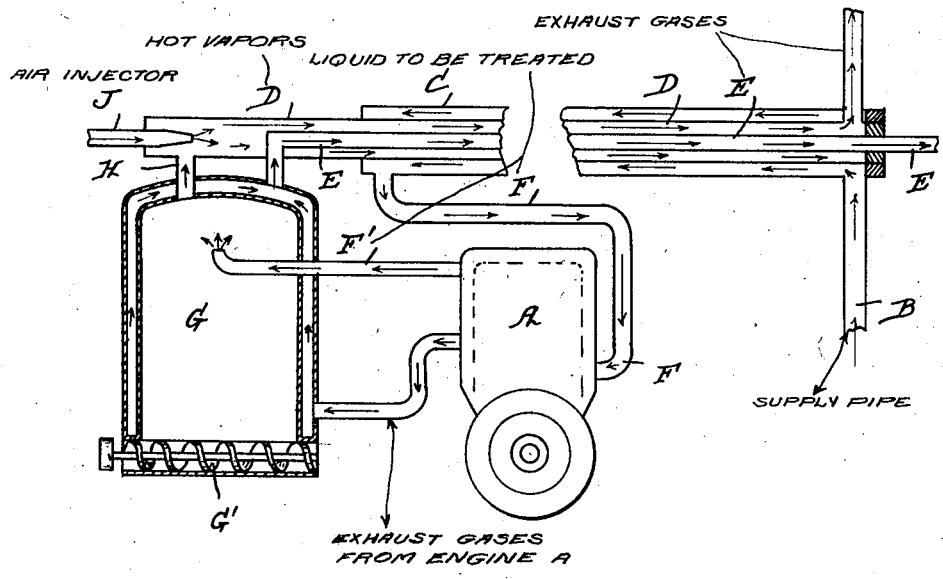
Inventor:
Hector Norman McLeod
By
Attorney Patented May 18, 1926.

1,585,300

UNITED STATES PATENT OFFICE.

HECTOR NORMAN McLEOD, OF WELLINGTON, NEW ZEALAND.

PROCESS FOR THE SEPARATION OF THE SOLID CONSTITUENTS OF LIQUIDS CONTAINING THEM.

Application filed June 28, 1924. Serial No. 723,067.

This invention has for its object the provision of a process whereby the solid constituents of liquids containing them in solution or suspension, may be recovered.

The invention has been particularly devised for the treatment of the present waste products from butter, cheese and like factories, such as the skim milk, butter milk or milk whey that is mostly allowed to run to waste for lack of a suitable economical method of recovery, in order that the valuable solid constituents thereof may be recovered for use in the arts and the manufactures, and the resultant liquor rendered innocuous by reason of the treatment to which the waste product is subjected. The installation of the invention will therefore serve the double purpose of recovering the valuable constituents of the waste product, and of preventing the pollution of rivers or streams at present caused by the running of such waste products thereinto.

Although the process has been particularly devised for dealing with such specific forms of waste products, it may be used in connection with other products or effluents having similar properties. For instance, it may be used for separating the solid constituents of whole milk for the purpose of cheese making.

The invention involves, generally, a process whereby the waste product or other liquid to be treated is subjected to the action of heat at such a degree of temperature as will in itself vaporize the liquid and cause the solid constituents thereof to separate out from the vapors, and fall down in the chamber wherein the vaporizing takes place, from which chamber they can thereafter be removed.

The invention further consists in a process according to which the liquid to be treated is subjected to an initial heating, and then to a subsequent treatment whereby the solids are precipitated from the liquid through the action of heat, such process involving the utilization of the waste heat from the resultant vapors to effect the initial heating of the liquid by a regenerative action. The said precipitation heat may be of such a temperature as to sterilize or deodorize the vapors or the subsequently obtained condensate, or to effect both sterilization and deodorization. In addition, the heating action may be carried on under pressure.

The invention still further consists in a process whereby liquid wastes or effluents of all kinds, may be treated to render them innocuous, by the application of heat of sufficient temperature to which such material is subjected, and in which the waste heat from the outflowing material is used to regeneratively and initially heat the material being treated.

In carrying out the invention according to one method, the liquid being treated is placed within a receiver and is drawn therefrom and forced or induced onwards under suitable pressure by a pump or by a steam injector, or other suitable means, through a circulatory pipe system of approved design and length, wherein it is heated to a predetermined degree by the regenerative method hereinafter described. It then passes to a precipitating chamber into which it is introduced in the form of a liquid or spray and in the presence or under the action of hot air, gases or vapours, so that the liquid is converted into vapour or steam and the solids precipitated on a principle already well known in connection with the treatment of milk or milk products, and then withdrawn from the chamber. Such chamber may however be under the action of reduced pressure so that the heat necessary to precipitate the solids is reduced and the cost of working economized. The steam or vapour passes away from the chamber through a pipe system enclosed by the feed pipe system or arranged in such intimate relation thereto that the heat given off acts upon the product in a regenerative manner to impart the initial heating thereto. The escaping vapour and the feed supply travel in respectively opposite directions so that the product being treated is gradually heated to a maximum and the vapour gradually cooled and condensed to pass off in a clear or innocuous liquor. Or, the liquid after being heated by approved means, is sent back to act regeneratively on the liquid supply and is then passed through a separating machine.

The heating medium may be steam, hot air, or other medium, and the medium may be passed through the system with the product or by a separate course.

The details of construction and arrangement of apparatus for carrying out the invention may be varied in a large number of ways to suit the special circumstances prevailing in each installation, and more particularly to suit the form of heating agency that may be employed. It is desired in order that the process may be carried out effectively that the whole shall be self contained in its action, as for instance by using the waste and exhaust heat from a motor used to provide the circulation, as the heating agent for the material being treated. Or in other cases the waste steam, gases or vapours from other power producing agencies, or electric heating appliances, may be employed.

In every instance however, the same general principles are embodied and these principles are illustrated in the accompanying diagrammatic drawing of a self contained system.

In this system a gas or oil engine A is employed to actuate a pump by means of which the supply of material under treatment is forced in through a supply pipe B to the further end of the outer jacket C of three concentrically arranged tubes C—D and E. These are made of any desired length and the inner end of the jacket C is connected by pipe F to a jacket around the cylinder of the engine A so that the liquid passes through this jacket and then away through a pipe F' to the inside of a precipitating chamber G of any known design. Into this the liquid is sprayed in a highly heated or steaming condition so that the solids are precipitated and are removed by the screw conveyor G' in its bottom or by other approved mechanical devices. The steam or hot vapours then pass away and are led by the pipe H to the second jacket D of the three concentrically arranged tubes and are carried through it so that the cold liquid passing in a contrary direction along the outer jacket is heated thereby in the regenerative manner referred to. If desired the passage of the steam or hot vapours from the chamber G may be aided by the employment of an air injector J arranged in the end of the jacket D which also tends to produce a vacuum in the chamber to aid the supply of liquid thereto. The vapours or gases, or condensed liquid, finally pass away from the further end of this tube to waste in a sterilized or deodorized condition.

The exhaust gases of the engine are led first through a jacket surrounding the chamber G so that the chamber is kept hot, and then into the central tube E and along it, to escape from the further end. The heat therefore from the engine exhaust is also employed to regeneratively heat the supply.

In some cases, however, this central tube may not be needed and may be dispensed with.

I claim:—

1. A continuous process for the recovery of the solid constituents of liquids containing them, comprising the steps of injecting the liquid into a jacketed chamber and simultaneously delivering a gaseous heating medium into the jacket of such chamber, to help vaporize the liquid and precipitate its solid constituents in powder form upon the bottom of the chamber; and withdrawing the hot vapors from the tops of said chamber and of said jacket and circulating them in countercurrent in the path of a stream of fresh liquid internally of such stream, to pre-heat the latter before it enters the precipitating chamber.

2. A continuous process for the recovery of the solid constituents of liquids containing them, comprising the steps of supplying the liquid to the jacket of an engine cylinder to be heated thereby; injecting the heated liquid from such jacket under pressure into a jacketed precipitation chamber in spray form; simultaneously delivering the hot exhaust gases from the engine into the jacket of said chamber to help vaporize the spray and precipitate the solid constituents of the liquid; and simultaneously withdrawing the heated vapors from said chamber and the hot gases from its jacket and circulating them in counter-current in the path of a stream of fresh liquid, internally of such stream, to preheat the latter before it reaches the engine cylinder.

3. A continuous process for the recovery of the solid constituents of liquids containing them, comprising the steps of spraying the liquid to be treated into a heated chamber under pressure, to vaporize the liquid and precipitate its solid constituents in powder form; withdrawing the heated vapors from the top of said chamber and circulating them in counter-current in the path of a stream of fresh liquid, to preheat the latter before it enters the precipitating chamber; and injecting a gaseous fluid other than the vapors themselves into the current of heated vapors at a point external of, but close to, said chamber so as to create a suction action in the chamber.

4. Apparatus for the recovery of the solid constituents of liquids containing them, comprising a closed precipitating chamber; heating means therefor; and a piping system embodying a plurality of co-axially nested pipes, one of which is in communication with the precipitating chamber to deliver the liquid thereto to be vaporized by the heat and the solid constituents precipitated in powder form, and another of which leads from the top of said chamber to discharge the hot vapors therefrom and conduct them axially along the delivery pipe in counter-current with the in-coming liquid to pre-heat the latter.

5. Apparatus according to claim 4, in which the delivery pipe of the pipe system communicates with the precipitation chamber by means of a separate pipe, one part of which leads to the jacket of an engine cylinder, and the other part of which leads from said jacket into said chamber, whereby the liquid passing through said pipe is subjected to a further pre-heating before reaching the precipitation chamber; and in which said chamber has a heating jacket to which the exhaust pipe of the engine leads.

6. Apparatus for the recovery of the solid constituents of liquids containing them, comprising a closed precipitating chamber; heating means therefor; a piping system embodying a plurality of coaxially nested pipes, one of which is in communication with said chamber to deliver the liquid thereto to be vaporized and the solid constituents precipitated in powder form, and another of which leads from the top of the chamber to discharge the hot vapors therefrom and conduct them axially along the delivery pipe in counter-current with the in-coming liquid to pre-heat the latter; and a device located externally of the chamber but in proximity to the inlet end of the discharge pipe to inject into that pipe a gaseous fluid other than the vapors themselves and thereby create a suction action in the chamber.

7. Apparatus for the recovery of the solid constituents of liquids containing them, comprising a closed precipitating chamber having a heating jacket; means for supplying a hot gaseous heating agent to said chamber; and a piping system embodying three nested pipes, one of which is in communication with said chamber to deliver the liquid thereto to be vaporized and the solid constituents precipitated in powder form, another of which leads from the top of the chamber to discharge the hot vapors therefrom, and the third of which leads from the top of said jacket to discharge the gaseous heating agent, the two discharge pipes conducting the fluids passing therethrough axially along the delivery pipe in counter-current with the in-coming liquid to pre-heat the latter.

In testimony whereof, I affix my signature.

HECTOR NORMAN McLEOD.